(12) United States Patent
Akiyama (10) Patent No.: US 7,454,432 B2
(45) Date of Patent: Nov. 18, 2008

(54) SECTION IDENTIFICATION AND DISTRIBUTION SYSTEM MONITORING SYSTEM, METHOD AND PROGRAM PRODUCT

(75) Inventor: Mitsuhiro Akiyama, Nakai-machi (JP)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 11/037,756

(22) Filed: Jan. 18, 2005

(65) Prior Publication Data

US 2005/0165730 A1    Jul. 28, 2005

(30) Foreign Application Priority Data

Jan. 22, 2004    (JP)    ............... 2004-014321

(51) Int. Cl.
- G06F 7/06    (2006.01)
- G06F 7/10    (2006.01)
- G06F 17/30   (2006.01)
- G06F 11/26   (2006.01)

(52) U.S. Cl. .................. 707/101; 707/102; 707/3; 707/4; 714/40

(58) Field of Classification Search .......... 714/40; 707/3, 4, 101, 102
See application file for complete search history.

(56) References Cited

U.S. PATENT DOCUMENTS

| | | | |
|---|---|---|---|
| 6,480,857 B1 * | 11/2002 | Chandler | 707/100 |
| 6,848,029 B2 * | 1/2005 | Coldewey | 711/137 |
| 6,925,504 B1 * | 8/2005 | Liskov et al. | 709/239 |
| 2003/0012130 A1 * | 1/2003 | Novaes et al. | 370/218 |
| 2004/0047300 A1 * | 3/2004 | Enomoto et al. | 370/256 |
| 2005/0050060 A1 * | 3/2005 | Damm et al. | 707/100 |
| 2005/0050072 A1 * | 3/2005 | Widdup et al. | 707/100 |

(Continued)

FOREIGN PATENT DOCUMENTS

JP    PUPA 07-227042    8/1995

(Continued)

OTHER PUBLICATIONS

Thomas L. Rodeheffer and Michael D. Schroeder; "Automatic reconfiguration in Autonet"; 1991; ACM Press; "SOSP '91: Proceedings of the thirteenth ACM symposium on Operating systems principles"; 183-197.*

(Continued)

Primary Examiner—Kuen S. Lu
Assistant Examiner—Patrick E Sweeney
(74) Attorney, Agent, or Firm—Scully, Scott, Murphy & Presser, P.C.; Willaim H. Steinberg, Esq.

(57) ABSTRACT

A system and a method are provided for specifying arbitrary nodes and identifying a section between them on a system diagram of a distribution system. It comprises a system diagram information management portion for managing information on each of nodes and spans constituting the system diagram and ID information given to each of the nodes, an input portion for receiving an input specifying the nodes, a search portion for creating a search condition using the ID information based on the node specification and searching the span between the specified nodes so as to identify the section constituted by the searched span, and an output portion for display-outputting the system diagram visually indicating the section identified by the search portion.

2 Claims, 12 Drawing Sheets

U.S. PATENT DOCUMENTS

2007/0005193 A1* 1/2007 Nelson et al. .............. 700/286
2007/0195796 A1* 8/2007 Ushiyama et al. .......... 370/396

FOREIGN PATENT DOCUMENTS

| JP | PUPA 8-69490 | 3/1996 |
| JP | PUPA 09-070141 | 3/1997 |
| JP | PUPA 10-063671 | 3/1998 |
| JP | PUPA 10-070840 | 3/1998 |
| JP | PUPA 10-132200 | 5/1998 |
| JP | PUPA 2003-281150 | 10/2003 |

OTHER PUBLICATIONS

William J. Weiland and Ben Shneiderman; "A graphical query interface based on aggregation/generalization hierarchies"; 1993; Information Systems vol. 18, No. 4, 215-232.*

Baran, M.E.; Wu, F.F., "Network reconfiguration in distribution systems for loss reduction and load balancing," Power Delivery, IEEE Transactions on, vol. 4, No. 2, pp. 1401-1407, Apr. 1989☐☐.*

Jun Zhu; Lubkeman, D.L.; Girgis, A.A., "Automated fault location and diagnosis on electric power distribution feeders," Power Delivery, IEEE Transactions on, vol. 12, No. 2, pp. 801-809, Apr. 1997.*

* cited by examiner

| SYSTEM | X | Y | ID1 | ID2 | ID3 | ID4 | ID5 | ID6 | ID7 | ID8 | ID9 | ID10 |
|---|---|---|---|---|---|---|---|---|---|---|---|---|
| 431851 | 0  | 0   | 1 | 0 | 0 | 0 | 0 | 0 | 0 | 0 | 0 | 0 |
| 431851 | 10 | 0   | 2 | 0 | 0 | 0 | 0 | 0 | 0 | 0 | 0 | 0 |
| 431851 | 20 | 0   | 3 | 0 | 0 | 0 | 0 | 0 | 0 | 0 | 0 | 0 |
| 431851 | 30 | 0   | 4 | 0 | 0 | 0 | 0 | 0 | 0 | 0 | 0 | 0 |
| 431851 | 40 | 0   | 5 | 0 | 0 | 0 | 0 | 0 | 0 | 0 | 0 | 0 |
| 431851 | 20 | -10 | 3 | 1 | 0 | 0 | 0 | 0 | 0 | 0 | 0 | 0 |
| 431851 | 20 | -20 | 3 | 2 | 0 | 0 | 0 | 0 | 0 | 0 | 0 | 0 |
| 431851 | 20 | -30 | 3 | 3 | 0 | 0 | 0 | 0 | 0 | 0 | 0 | 0 |
| 431851 | 20 | -40 | 3 | 4 | 1 | 0 | 0 | 0 | 0 | 0 | 0 | 0 |
| 431851 | 20 | -50 | 3 | 5 | 2 | 0 | 0 | 0 | 0 | 0 | 0 | 0 |
| 431851 | 20 | -30 | 3 | 3 | 3 | 0 | 0 | 0 | 0 | 0 | 0 | 0 |
| 431851 | 30 | -30 | 3 | 3 | 4 | 1 | 0 | 0 | 0 | 0 | 0 | 0 |
| 431851 | 40 | -30 | 3 | 3 | 2 | 2 | 2 | 0 | 0 | 0 | 0 | 0 |
| 431851 | 50 | -30 | 3 | 3 | 2 | 3 | 0 | 0 | 0 | 0 | 0 | 0 |
| 431851 | 60 | -30 | 3 | 3 | 2 | 0 | 0 | 0 | 0 | 0 | 0 | 0 |
| 431851 | 40 | -40 | 3 | 3 | 2 | 0 | 0 | 0 | 0 | 0 | 0 | 0 |
| 431851 | 40 | -50 | 3 | 3 | 2 | 1 | 1 | 0 | 0 | 0 | 0 | 0 |
| 431851 | 40 | -60 | 3 | 3 | 2 | 2 | 2 | 0 | 0 | 0 | 0 | 0 |
| 431851 | 40 | -20 | 3 | 3 | 2 | 0 | 0 | 0 | 0 | 0 | 0 | 0 |
| 431851 | 40 | -10 | 3 | 3 | 3 | 1 | 0 | 0 | 0 | 0 | 0 | 0 |
| 431851 | 50 | -40 | 3 | 3 | 3 | 2 | 0 | 0 | 0 | 0 | 0 | 0 |
| 431851 | 50 | -50 | 3 | 3 | 3 | 0 | 0 | 0 | 0 | 0 | 0 | 0 |

FIG.6

| SYSTEM | X1 | Y1 | X2 | Y2 | ID1 | ID2 | ID3 | ID4 | ID5 | ID6 | ID7 | ID8 | ID9 | ID10 |
|---|---|---|---|---|---|---|---|---|---|---|---|---|---|---|
| 431851 | 0 | 0 | | | | 0 | 0 | 0 | 0 | 0 | 0 | 0 | 0 | 0 |
| 431851 | 0 | 0 | 10 | 0 | 1 | 0 | 0 | 0 | 0 | 0 | 0 | 0 | 0 | 0 |
| 431851 | 10 | 0 | 20 | 0 | 2 | 0 | 0 | 0 | 0 | 0 | 0 | 0 | 0 | 0 |
| 431851 | 20 | 0 | 30 | 0 | 3 | 0 | 0 | 0 | 0 | 0 | 0 | 0 | 0 | 0 |
| 431851 | 30 | 0 | 40 | 0 | 4 | 0 | 0 | 0 | 0 | 0 | 0 | 0 | 0 | 0 |
| 431851 | 20 | 0 | 20 | −10 | 5 | 1 | 0 | 0 | 0 | 0 | 0 | 0 | 0 | 0 |
| 431851 | 20 | −10 | 20 | −20 | 3 | 2 | 0 | 0 | 0 | 0 | 0 | 0 | 0 | 0 |
| 431851 | 20 | −20 | 20 | −30 | 3 | 3 | 0 | 0 | 0 | 0 | 0 | 0 | 0 | 0 |
| 431851 | 20 | −30 | 20 | −40 | 3 | 4 | 1 | 0 | 0 | 0 | 0 | 0 | 0 | 0 |
| 431851 | 20 | −40 | 20 | −50 | 3 | 5 | 2 | 0 | 0 | 0 | 0 | 0 | 0 | 0 |
| 431851 | 20 | −30 | 30 | −30 | 3 | 3 | 3 | 0 | 0 | 0 | 0 | 0 | 0 | 0 |
| 431851 | 30 | −30 | 40 | −30 | 3 | 3 | 4 | 1 | 0 | 0 | 0 | 0 | 0 | 0 |
| 431851 | 40 | −30 | 50 | −30 | 3 | 3 | 2 | 2 | 0 | 0 | 0 | 0 | 0 | 0 |
| 431851 | 50 | −30 | 60 | −30 | 3 | 3 | 2 | 3 | 0 | 0 | 0 | 0 | 0 | 0 |
| 431851 | 40 | −30 | 40 | −40 | 3 | 3 | 2 | 0 | 2 | 0 | 0 | 0 | 0 | 0 |
| 431851 | 40 | −40 | 40 | −50 | 3 | 3 | 2 | 0 | 0 | 0 | 0 | 0 | 0 | 0 |
| 431851 | 40 | −50 | 40 | −60 | 3 | 3 | 2 | 0 | 0 | 0 | 0 | 0 | 0 | 0 |
| 431851 | 40 | −30 | 40 | −20 | 3 | 3 | 2 | 1 | 0 | 0 | 0 | 0 | 0 | 0 |
| 431851 | 40 | −20 | 40 | −10 | 3 | 3 | 3 | 0 | 1 | 0 | 0 | 0 | 0 | 0 |
| 431851 | 50 | −30 | 50 | −40 | 3 | 3 | 2 | 1 | 2 | 0 | 0 | 0 | 0 | 0 |
| 431851 | 50 | −40 | 50 | −50 | 3 | 3 | 3 | 2 | 0 | 0 | 0 | 0 | 0 | 0 |

SECTION IDENTIFICATION AND DISTRIBUTION SYSTEM MONITORING SYSTEM, METHOD AND PROGRAM PRODUCT

FIELD OF THE INVENTION

The present invention relates to a system for detecting a section from a system diagram such as a distribution system diagram, a system for monitoring an operational state and so on in the distribution system and so on by using the system, an information processing method thereof and a program for implementing them on a computer.

BACKGROUND OF THE INVENTION

In the case where an accident occurs in a distribution system for providing electric power from a substation to customers, a power failure occurs in an area where the electric power is supplied by that distribution system. In this case, it is required to promptly identify a section in which the power failure has occurred and restore the electric power supply.

Figure 11:
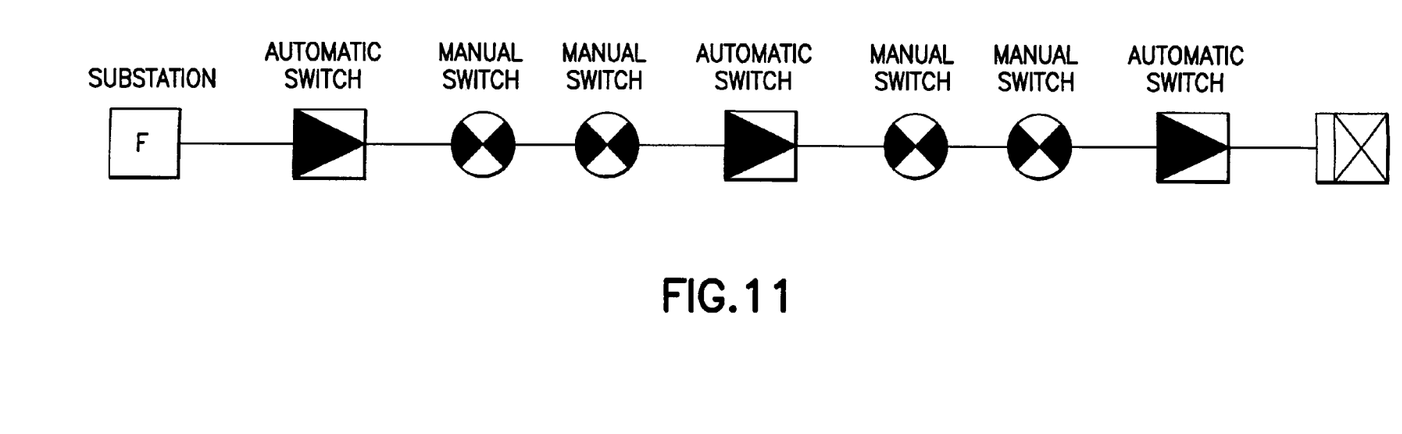
FIG. 11 is a diagram schematically showing one distribution system.

FIG. 11 is a diagram schematically showing one distribution system.

As shown in FIG. 11, switches normally exist on the distribution system, and it is possible, by opening and closing a desired switch, to pass and stop electricity from upstream to downstream of the switch on the distribution system. As regards the switches, there are automatic switches capable of automatically or remotely controlling opening and closing thereof and manual switches for manually and directly controlling the opening and closing thereof.

Figure 12:
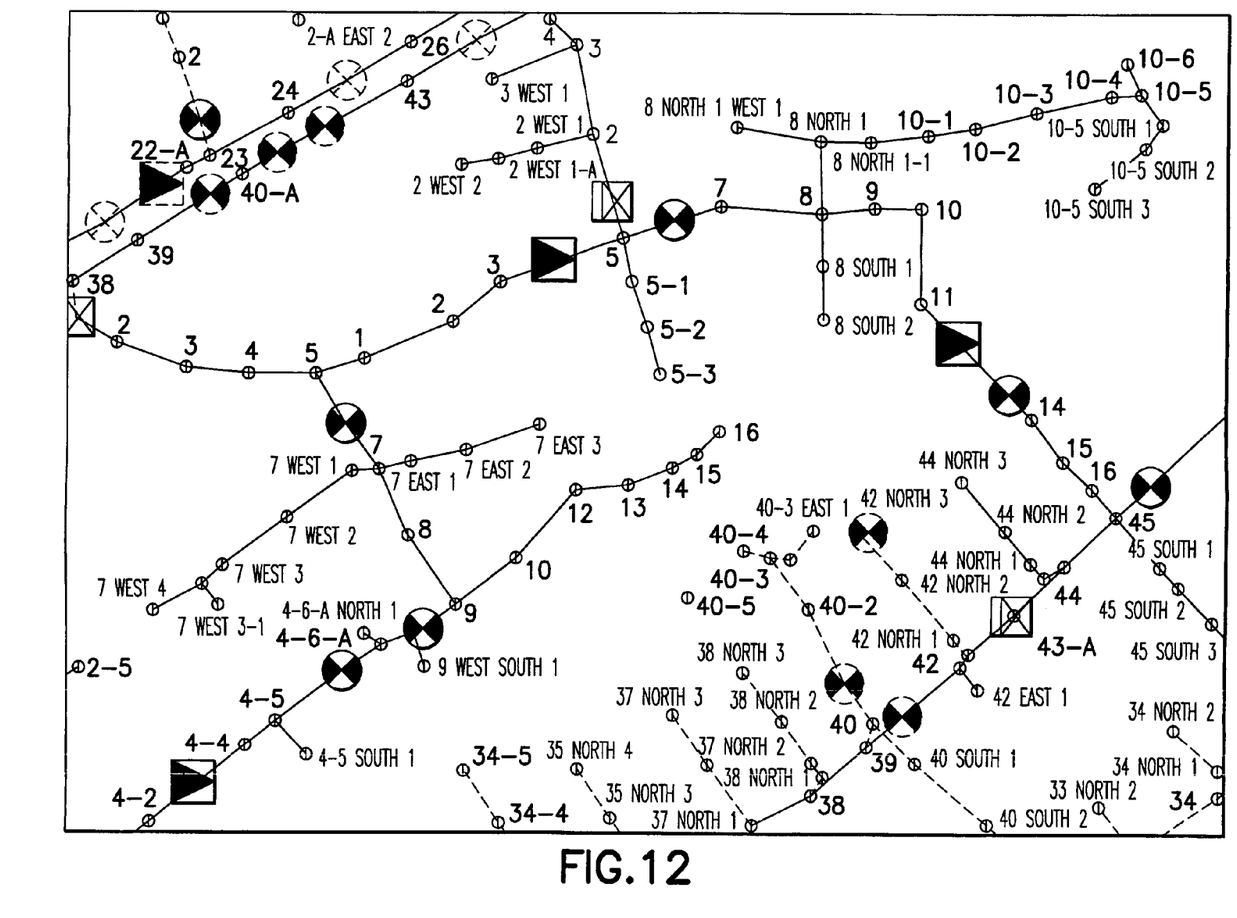
FIG. 12 is a high voltage distribution system diagram.

FIG. 12 is an example of a high voltage distribution system diagram.

As shown in FIG. 12, the distribution system diagram is comprised of nodes (points) and spans for connecting them. Here, the node corresponds to the substation (node at a starting point of the system), switch and an electric pole in an actual distribution system. And the span corresponds to a distribution power line (high-voltage wire in the example in FIG. 12). Each node has absolute coordinates (geographic coordinates such as latitude, longitude and plane rectangular coordinates set on a drawing) set thereto, and each span can be identified by the absolute coordinates of the nodes on both ends. Such a distribution system diagram can be rendered by using a GIS (Geographical Information System) which is a system used to combine map data (electronic map) with other data and software (databases and the like) and comprehensively manage and process it or visually display it and analyze and determine it so as to display it on a display device or print it out.

In the high voltage distribution system diagram in FIG. 12, the distribution system described shown by a solid line represents one system, and the distribution system shown by a dotted line means a different system from that with the solid line. As shown in FIG. 12, a predetermined distribution system is appropriately connected to other distribution systems so as to accommodate one another with the electric power to be supplied to the customers. For that reason, it is possible, in the case where the electric power can no longer be supplied to predetermined customers in the predetermined distribution system due to an accident, an overload, a construction and so on a distribution line, to recover from the power failure in that area if the electric power can be supplied to the customers from another distribution system.

To be more precise, in the case where a predetermined distribution power line is cut off for instance, it is not possible as-is to supply the electric power to any customer downstream from a cut-off point. However, it is feasible to open the switches on both ends (upstream and downstream) of the cut-off point, stop the electricity, close the switches connected to the other distribution systems and pass an electric current to a downstream side of the cut-off point so as to immediately restore it except between the open switches and narrow the area in which the power failure is occurring. And it can be returned to the original distribution system after restoring the cut-off point.

Therefore, in the case where an accident occurs to the distribution system, it is important to promptly determine which switch should be operated to allow supply of the electric power to which area. For this determination, it is necessary to specify two nodes in the distribution system diagram and identify a span network which is a section comprised of the span between them.

Conventionally, to meet this demand, the distribution system diagram described on paper together with a map is checked by a person to identify the span network between the predetermined nodes.

As described above, there are the automatic switches capable of remote operation. And there is conventionally a system for switching the distribution system to control the electric power supply to the distribution system by operating the automatic switch for example as shown in Japanese Published Unexamined Patent Application 8-69490. If which switch should be operated to allow supply of the electric power to which area in the distribution system is known, it is possible, even when an accident occurs, to use this conventional system and isolate an accident occurrence point from the distribution system by the remote operation so as to switch the distribution system and supply the electric power from another distribution system to the areas further downstream from the accident occurrence point.

As described above, to promptly recover from a power failure due to an accident in a distribution system and so on, there is a conventionally adopted technique of accommodating with electric power from another distribution system and narrowing an area in which the power failure is occurring. And it is necessary, for the sake of switching the distribution system, to identify a desired section (a span network between two nodes) on a distribution system diagram.

Conventionally, however, this operation is manually performed so that it is not efficient.

Even in the case of a conventional control system for switching the distribution system by controlling an automatic switch, it is necessary, before switching the distribution system, to grasp which switch should be operated to allow supply of the electric power to which area. And thus, the operation for identifying the section on the distribution system diagram is also required. In the case of an accident in the distribution system, it is also necessary to monitor which area the electric power has been supplied to on the distribution system diagram by the switching of the distribution system performed to narrow the area in which the power failure is occurring before eventually eliminating a cause of the accident.

Furthermore, the automatic switches and manual switches for manually and directly controlling opening and closing are usually mixed on the distribution system. Therefore, the area capable of controlling the supply of the electric power is limited in the case of operating only the automatic switches (the supply of the electric power can be controlled only for a large area, for instance). For that reason, it is necessary to operate the manual switches as well as the automatic switches in order to carefully control the supply of the electric power and minimize the area in which the power failure occurs on the switching of the distribution system and restoration after the accident. To operate the manual switches, a worker must go to the site to perform the operation. Therefore, to promptly perform the operation, it is desirable to be able to simulate and monitor which switch should be operated to supply the electric power to which area or to interrupt the supply thereof to which area on the distribution system diagram.

Thus, an object of the present invention is to provide a system for simulating, in the distribution system, which switch should be operated to supply the electric power to which area or to interrupt the supply thereof to which area on the distribution system diagram.

The present invention is applicable as-is not only to the distribution system for the supply of the electric power but also to various other system diagrams such as piping of gas and water service. Thus, another object of the present invention is to provide a system for specifying arbitrary nodes for a predetermined system diagram and identifying the span network between them and a method thereof.

OBJECTS AND SUMMARY OF THE INVENTION

To attain the objects, the present invention is implemented as a management system for managing information on components of a distribution system and obtaining and managing information on an accident if it occurs and a monitoring system comprising a section identification system for identifying an arbitrary section in a distribution system diagram.

The section identification system constituting the monitoring system comprises a system diagram information management portion for managing information on each of nodes and spans constituting a system diagram and ID information given to each of the nodes; an input portion for receiving an input specifying arbitrary nodes on the system diagram; a search portion for creating a search condition using the ID information based on node specification received by the input portion and searching the span between the specified nodes by using the search condition so as to identify a section constituted by the searched span; and an output portion for display-outputting the system diagram visually showing the section identified by the search portion.

Further in detail, the system diagram information management portion manages the ID information given to each of the nodes according to the following rules.

1. Serial numbers are put downstream from a starting point in the system diagram.
2. At a branch point on the system diagram, the serial numbers continued from the starting point are put on one branch at a branching destination, and new serial numbers starting from the branch point are put on other branches.

And it stores and manages, regarding each of the nodes, a first table having identification data of a system to which the node belongs, positional information and the ID information on the node registered therein, and regarding the span between the nodes, a second table having identification data of a system to which the span belongs, the positional information and the ID information on the nodes positioned at end points of the span registered therein.

Of the nodes specified by the input of the input portion, the search portion combines the search condition for performing a search from the most upstream node to downstream nodes in the system diagram with an exclusive search condition for excluding the downstream nodes from the nodes other than the most upstream node so as to create the search condition for searching the span between the specified nodes.

Other than attaining the objects, the present invention is also implemented as an information processing method as follows for identifying an arbitrary section in a system diagram with a computer.

This information processing method is characterized by including the steps of: creating the ID information given to each of the nodes on the system diagram according to the following rules and storing it in the storage means, receiving an input specifying arbitrary nodes on the system diagram, creating a search condition using the ID information based on inputted node specification and the ID information on the nodes stored in the storage means, and of the information on the nodes and spans constituting the system diagram stored in the storage means in advance, searching the span between the specified nodes by using the created search condition so as to identify a section on the system diagram constituted by the span, and display-outputting the identified section on the system diagram by visually showing it on the system diagram.

1. Serial numbers are put downstream from a starting point in the system diagram; and
2. At a branch point on the system diagram, the serial numbers continued from the starting point are put on one branch at a branching destination, and new serial numbers starting from the branch point are put on other branches.

Further in detail, the step of creating a search condition includes the steps of, of the specified nodes, creating the search condition for performing a search from the most upstream node to downstream nodes in the system diagram, creating an exclusive search condition for excluding the downstream nodes from the nodes other than the most upstream node, and creating the search condition for searching the span between the specified nodes by combining the search conditions.

The present invention is also implemented as a program for controlling the computer to implement functions of the above-mentioned section identification system or monitoring system or a program for causing the computer to execute processes corresponding to the steps in the information processing method. This program may be provided by storing and distributing it in a recording medium such as a magnetic disk, an optical disk or a semiconductor memory or delivering it via a network.

According to the present invention constituted as above, it is possible, by specifying arbitrary nodes on a system diagram such as a distribution system diagram, to identify a section between the nodes (span network).

It is thereby possible to simulate which switch should be operated to supply the electric power to which area or to interrupt the supply thereof to which area on the distribution system diagram.

Furthermore, it is possible to obtain the information identifying the switch to be operated from a management system for managing the accidents and power failures in the distribution system and return to the management system the information on a section identified by a search using the ID information on the node corresponding to this switch so as to reflect it on the distribution system diagram. Thus, it is feasible to implement the monitoring system capable of monitoring on the distribution system diagram whether or not a power failure has occurred in the area due to the switch having undergone the accident and which area has the electric power supplied by switching the distribution system.

DETAILED DESCRIPTION OF THE PREFERRED EMBODIMENT OF THE INVENTION

Hereafter, a detailed description will be given by referring to attached drawings as to a preferred embodiment for implementing the present invention (hereafter, the embodiment).

Figure 1:
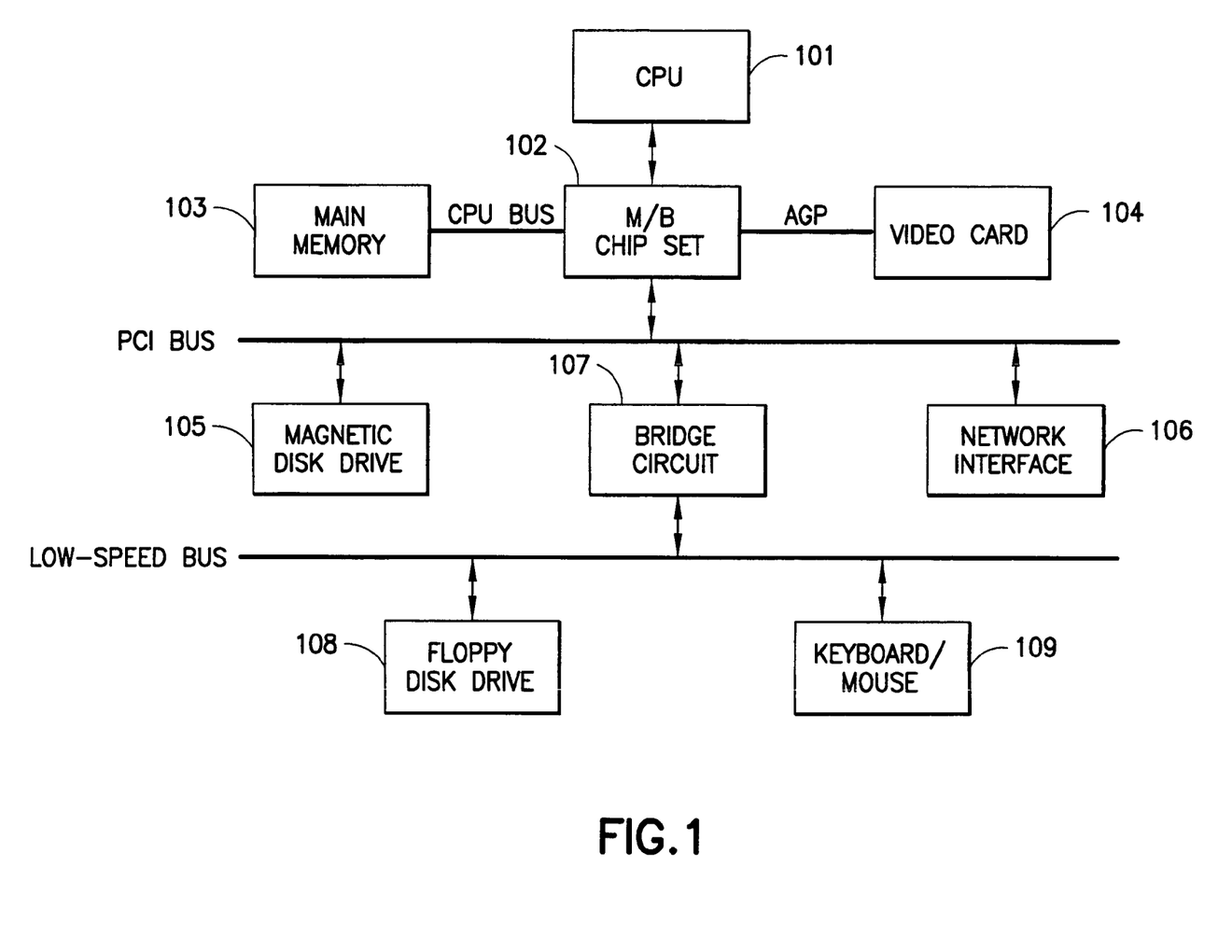
FIG. 1 is a diagram schematically showing an example of a hardware configuration of a computer suitable for implementing a section identification system according to this embodiment.

FIG. 1 is a diagram schematically showing an example of a hardware configuration of a computer suitable for implementing a section identification system according to this embodiment.

The computer shown in FIG. 1 comprises a CPU (Central Processing Unit) 101 which is a computing means, a main memory 103 connected to the CPU 101 via an M/B (Mother Board) chip set 102 and a CPU bus, a video card 104 also connected to the CPU 101 via the M/B chip set 102 and an AGP (Accelerated Graphics Port), a magnetic disk drive (HDD) 105 and a network interface 106 connected to the M/B chip set 102 via a PCI (Peripheral Component Interconnect) bus, and a floppy disk drive 108 and a keyboard/mouse 109 connected to the M/B chip set 102 via a bridge circuit 107 and a low-speed bus such as an ISA (Industry Standard Architecture) bus from the PCI bus.

FIG. 1 only illustrates the hardware configuration of the computer for implementing this embodiment, and other various configurations may be adopted if this embodiment is applicable. For instance, it is possible to mount only a video memory instead of providing the video card 104 so as to process image data with the CPU 101. It is also possible to provide a CD-R (Compact Disc Recordable) drive or a DVD-RAM (Digital Versatile Disc Random Access Memory) drive via an interface such as ATA (AT Attachment) or SCSI (Small Computer System Interface) as an external storage.

Figure 2:
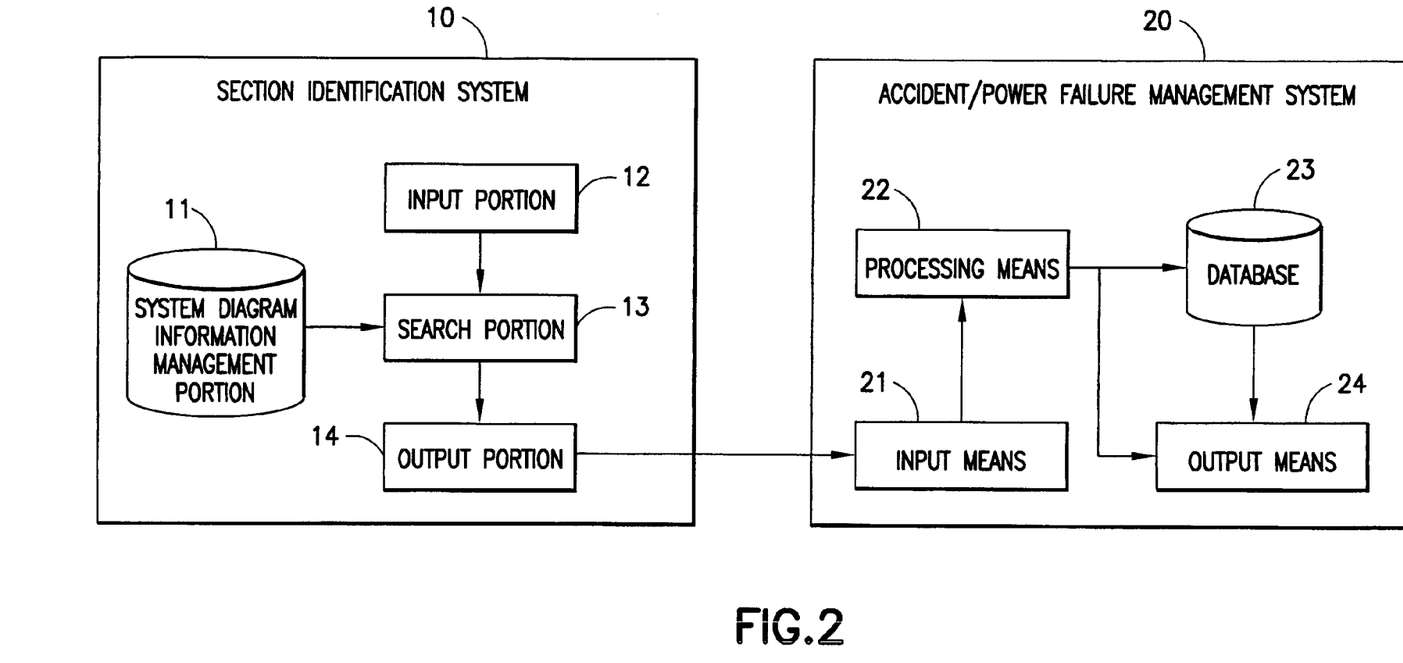
FIG. 2 is a diagram showing a configuration of a management system of a distribution system to which this embodiment is applied.

FIG. 2 is a diagram showing a configuration of a management system of a distribution system to which this embodiment is applied.

With reference to FIG. 2, a section identification system 10 according to this embodiment is connected to an accident/power failure management system 20 for managing information on accidents and power failures in a distribution system, and is used in order to identify a section in which the accident or power failure has occurred.

As for the accident/power failure management system 20, an existing management system may be used. Today, power companies have generally introduced the management system for collecting and analyzing the information on accidents and distribution system to contribute to recovery operations in the case where the accident occurs in the distribution system. As shown in FIG. 2 for instance, such a system comprises an input means 21 for obtaining the information on an operational state of the switches and so on from a remote monitoring system for distribution, a processing means 22 for analyzing the information on a type, a cause and an occurrence point of the accident, a prospect of recovery and so on based on the information obtained by the input means 21 in the case where the accident has occurred in the distribution system, a database 23 for managing the information on substations, switches, electric poles and so on constituting the distribution system, the information on customers and the information on the accident obtained by processing of the processing means 22, and an output means 24 for creating a distribution system diagram by using GIS, displaying an area in which the power failure is occurring on the distribution system diagram based on the information on the switches which it is managing, and delivering the information on the area in which the power failure is occurring to terminals of branch offices.

The section identification system 10 specifies a plurality of arbitrary nodes on the distribution system diagram, and thereby identifies the area between the nodes (section). And it shows the identified area on the distribution system diagram and supplies the information identifying this area to the accident/power failure management system 20. As shown in FIG. 2, the section identification system 10 comprises a system diagram information management portion 11 for managing information on the distribution system diagram, an input portion 12 for inputting the information for identifying a predetermined section on the system diagram, a search portion 13 for searching the section on the system diagram based on input information, and an output portion 14 for outputting the information of the section obtained as a search result.

In the configuration, the system diagram information management portion 11 is implemented, for instance, by the program-controlled CPU 101 and a storage means such as the main memory 103 or the magnetic disk drive 105 in the computer shown in FIG. 1. The input portion 12 is implemented, for instance, by the program-controlled CPU 101 and an input device such as the keyboard/mouse 109 shown in FIG. 1. The search portion 13 is implemented, for instance, by the program-controlled CPU 101 shown in FIG. 1. The output portion 14 is implemented, for instance, by the video card 104 shown in FIG. 1 and a display device not shown.

The system diagram information management portion 11 manages the information on the nodes and spans constituting the distribution system diagram (including absolute coordinates) and ID information given to the nodes according to this embodiment. The ID information is constituted by a set of one or a plurality of numbers, where the number of combined numbers indicates a depth (level) of an ID. If the ID of the depth of level (x) is represented as an ID (x), the ID of the depth up to level 5 is represented as [ID1, ID2, ID3, ID4, ID5] by a set of five numbers.

A more detailed description will be given as to this method of providing the ID information to the nodes. The following are basic rules for providing the ID information.

Firstly, serial numbers (IDs) are put downstream from a starting point in the system diagram.

Secondly, at a branch point on the system diagram, the serial numbers continued from the starting point are put on one branch at a branching destination, and new serial numbers (IDs) starting from the branch point are put on other branches. In this case, as many new numbers as the number of branches separated by branching are put, and so the number of the IDs increase. This is the above-mentioned depth of ID. To be more specific, the depth of ID is corresponding to the number of branches in the system diagram. For instance, in the case where the number of branches of the spans is three on the node on which the ID of level 1 is put, the ID of level 1 continues to be provided to one node at the branching destination, the ID of level 2 which is deeper by one step is newly provided to one of the other nodes, and the ID of level 3 which is deeper by two steps is newly provided to the other node.

Hereafter, the procedure will be described in order by referring to a flowchart.

Figure 3:
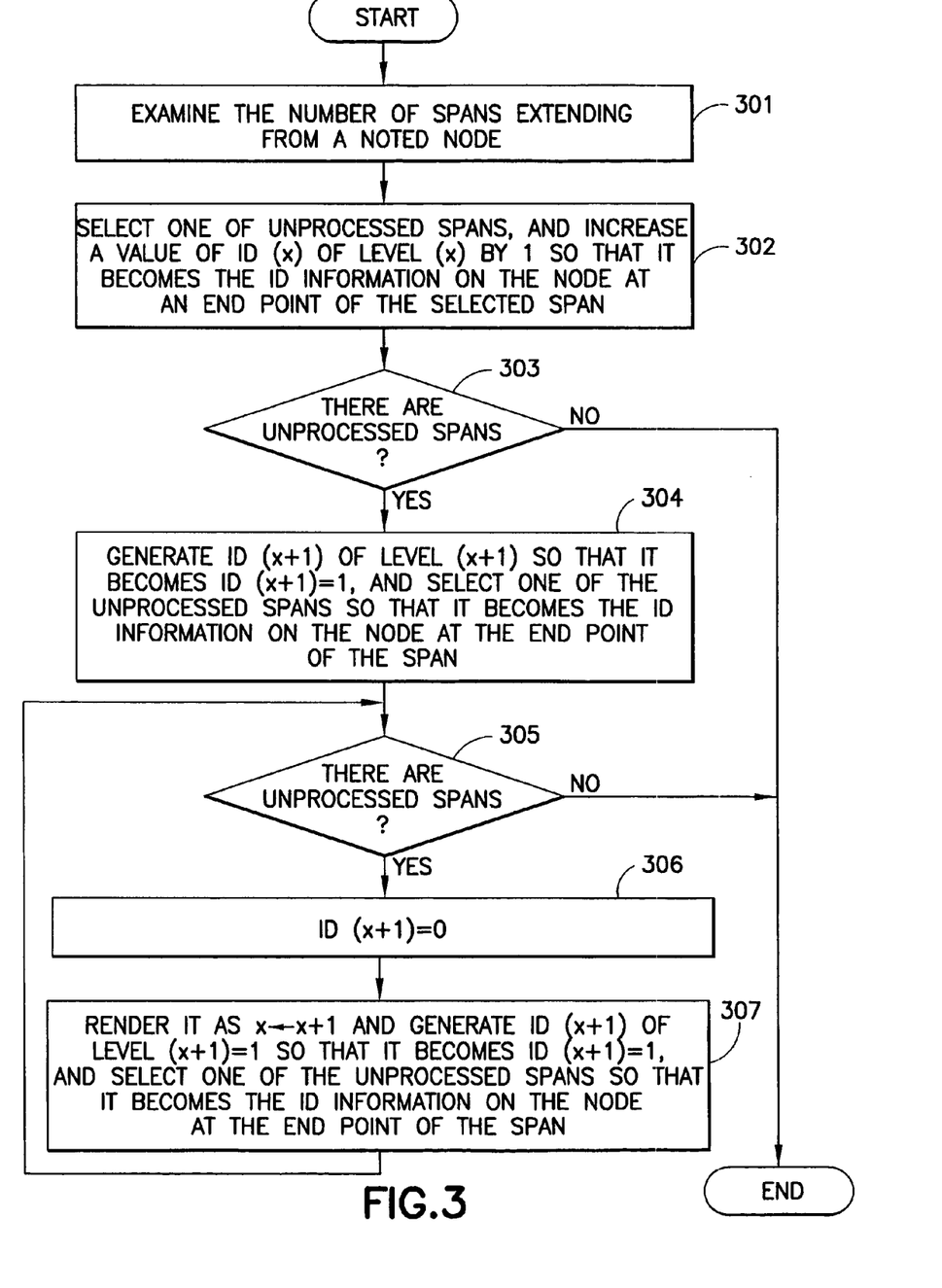
FIG. 3 is a flowchart for explaining a method of providing ID information according to this embodiment.

FIG. 3 is a flowchart for explaining the method of providing the ID information. FIG. 4 are diagrams for explaining how the IDs are put on the nodes.

With reference to FIG. 3, a predetermined node (node A) is noted first, and the ID information on the node A and the number of the spans extending downstream from the node A are examined (step 301). Here, if the level of the ID of the node A is level 5 and ID1=1, ID2=2, ID3=3, ID4=4 and ID5=5 are put, then the ID of the node A is [1, 2, 3, 4, 5]. As shown in FIG. 4, the number of the spans going out of the node A is three.

Figure 4A:
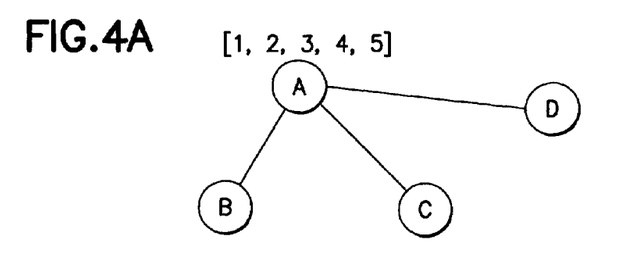
FIG. 4 are diagrams for explaining how IDs are put on nodes according to this embodiment.
Figure 4B:
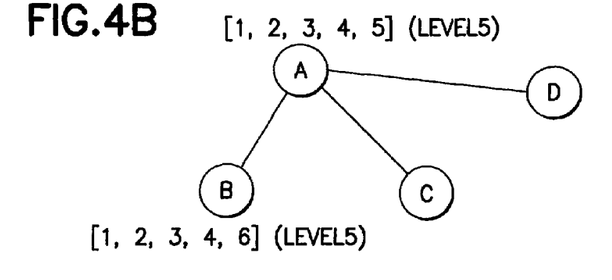

Next, one of the spans going out of the node A is selected, and a value of ID (x) in the ID information of level (x) on the node A is increased by one so that it becomes the ID information on the node at an end point of the span (node B) (step 302). To be more specific, as shown in FIG. 4(B), the ID of the node B is [1, 2, 3, 4, 6] by adding 1 to ID5=5 of the ID of the node A.

Next, it is examined whether or not there are unprocessed spans remaining (step 303), and if remaining, one of the unprocessed spans is selected to provide the ID information to it by using the following procedure.

Figure 4C:
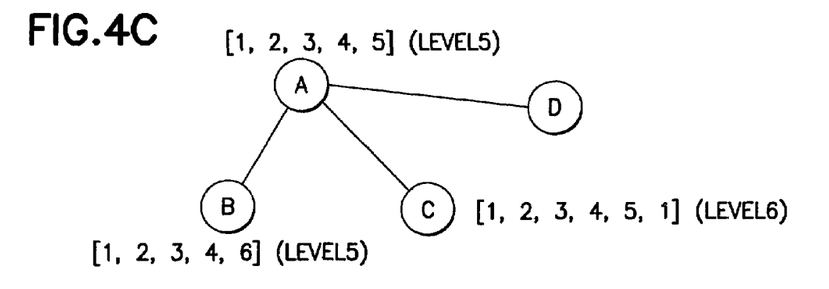

To be more specific, the value of ID5 is returned to the value before the step 302, and level (x) is increased by one to level (x+1) to generate ID(x+1) of which value should be 1 so as to be the ID information on the node at the end point of the unprocessed span (step 304). Thus, the level of the ID information becomes deeper by one step. To be more precise, as shown in FIG. 4(C), the ID of the node C becomes [1, 2, 3, 4, 5, 1] by adding ID 6=1 of level 6 (=5+1) to the ID of the node A.

Next, it is further examined whether or not there are unprocessed spans remaining (step 305), and if remaining, one of the unprocessed spans is selected to provide the ID information to it by using the following procedure.

Figure 4D:
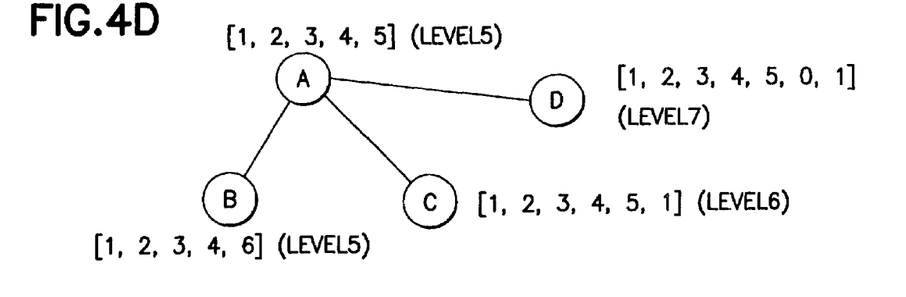

First, the value of ID(x+1) generated in the step 304 (or a step 307 mentioned later) should be 0 (step 306). And x+1 is rendered as a new x (x←x+1) and then level (x) is increased by one to level (x+1) to generate ID(x+1) of which value should be 1 so as to be the ID information on the node at the end point of the unprocessed span (step 307). Thus, the level of the ID information becomes still deeper by one step. To be more precise, as shown in FIG. 4(D), the ID of the node D becomes [1, 2, 3, 4, 5, 0, 1] as ID 6 of level 6 becomes 0 against the ID of the node C first and ID 7=1 of level 7 (=6+1) is further added thereto.

Once the ID information is provided to the nodes at the end points of all the spans going out of the noted node A as above, the processing to the node A is finished (steps 303, 305). And the noted node is shifted to a node downstream of the node A so as to provide the ID information likewise. This is repeated from the node corresponding to the substation as the starting point of the distribution system to the node at the terminal so that the ID information is provided to all the nodes on the distribution system diagram.

The ID information on the distribution system diagram of the distribution system to be managed is managed as a node table for managing the nodes constituting the distribution system diagram and a span table for managing the spans which are stored in the storage means such as the magnetic disk drive 105 shown in FIG. 1. Here, the node table is a table having, as to each individual node, the identification data on the distribution system to which the node belongs, absolute coordinates of the node and ID information on the node. And the span table is a table having, as to each individual span, the identification data on the distribution system to which the span belongs, absolute coordinates of the node positioned at the starting point of the span, absolute coordinates of the node positioned at the ending point of the span, and ID information on the node positioned at the ending point of the span.

The node table and span table will be further described by referring to the drawings.

Figure 5:
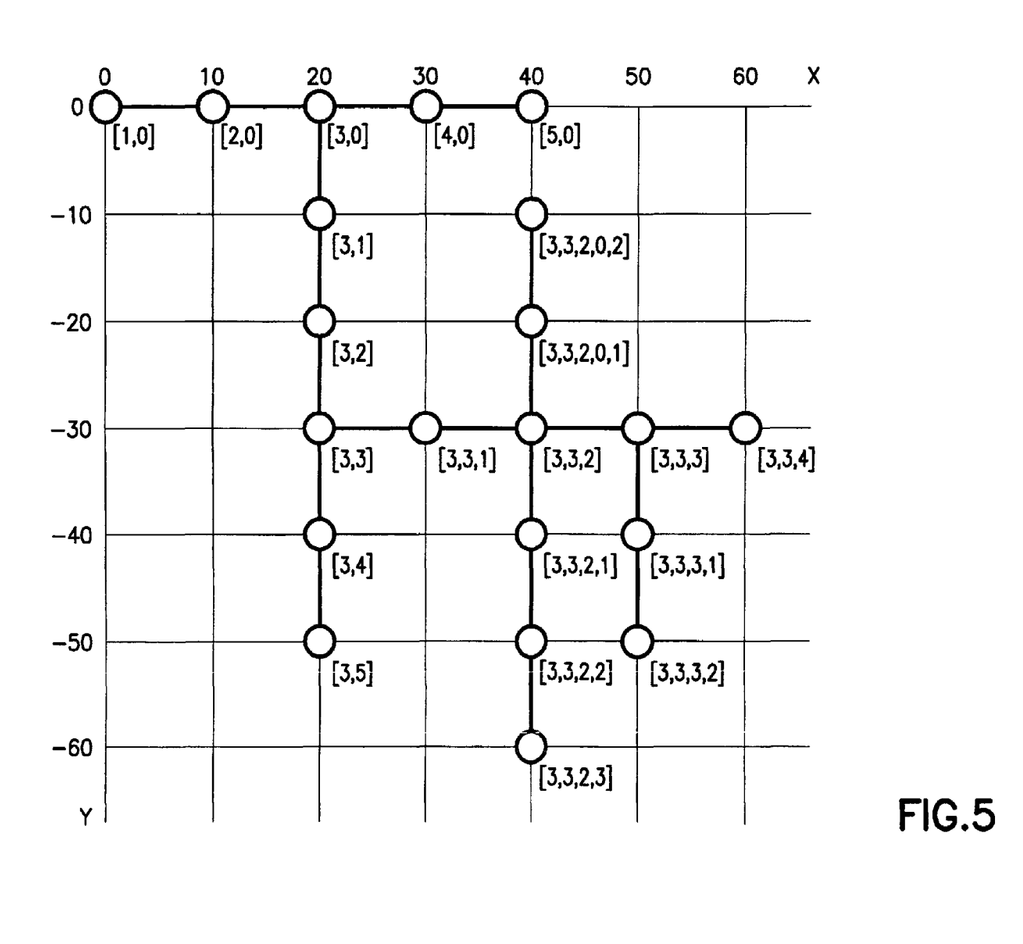
FIG. 5 is a diagram schematically showing a distribution system diagram.
Figure 6:
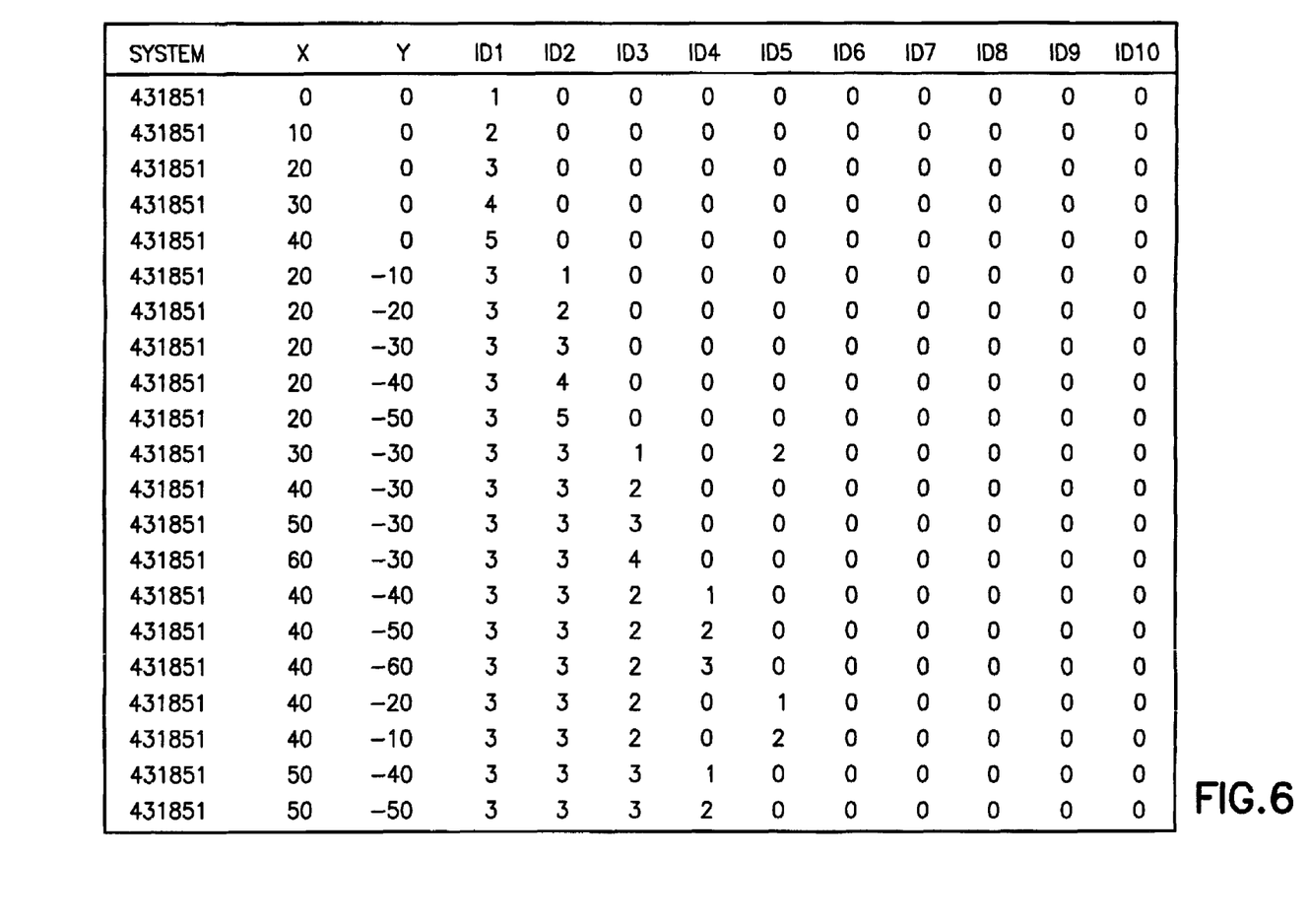
FIG. 6 is a diagram showing an example of a node table used in this embodiment.
Figure 7:
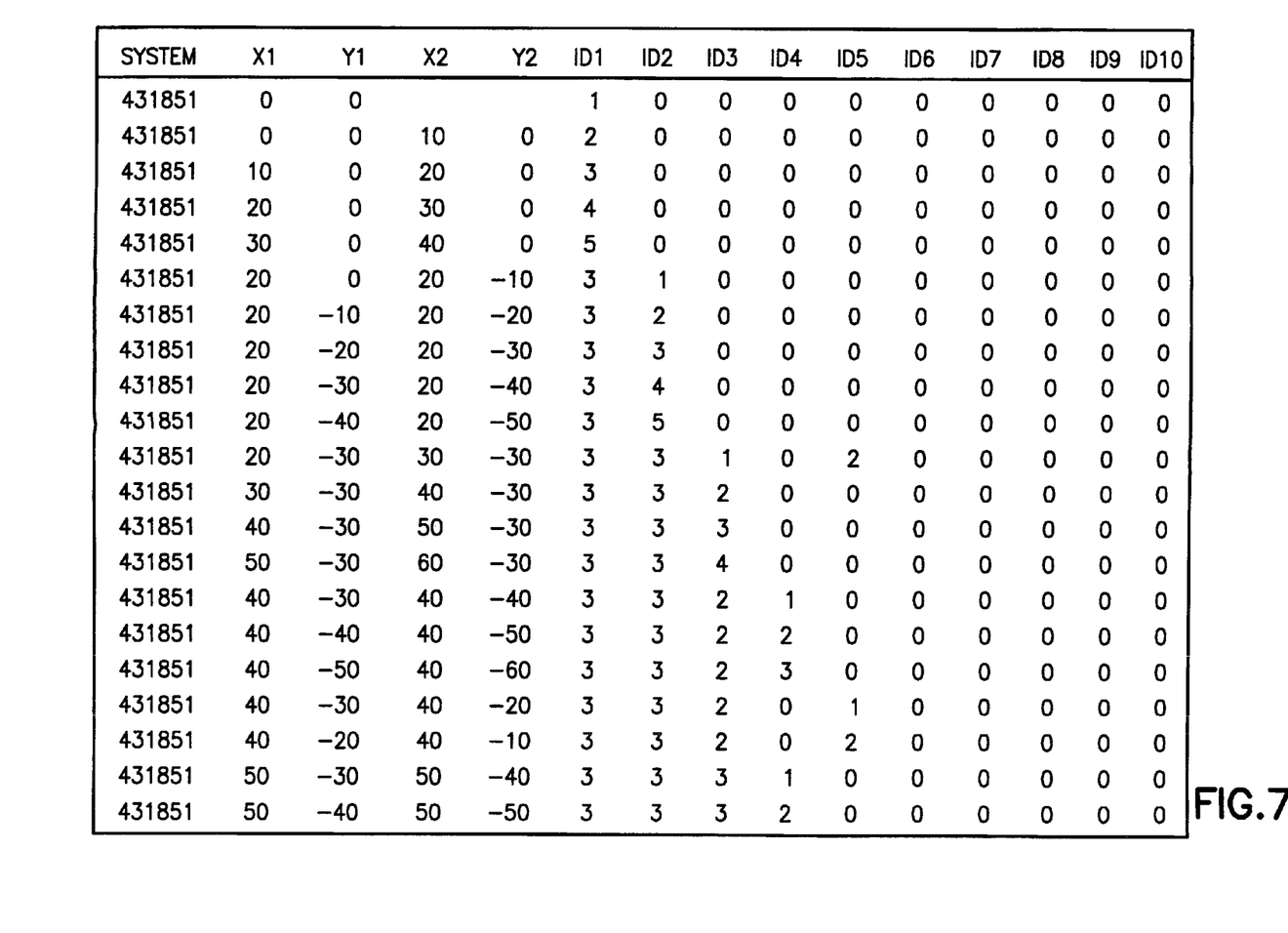
FIG. 7 is a diagram showing an example of a span table used in this embodiment.

FIG. 5 is a diagram schematically showing the distribution system diagram. FIG. 6 is a diagram showing an example of the node table. FIG. 7 is a diagram showing an example of the span table.

In FIG. 5, orthogonal coordinates (X and Y coordinates) of which origins (0, 0) are the node at the starting point of the distribution system are set in order to identify the absolute coordinates of each of the nodes. The ID information provided by the procedure in FIG. 3 is described at the lower right of each of the nodes. Hereafter, the nodes are identified according to this ID information in FIGS. 5 to 7.

With reference to FIG. 6, the node table has the distribution system (431851), absolute coordinates (X=20, Y=−40) and ID information (ID1=3, ID2=4, ID3 to ID10=0) registered therein as to the nodes [3, 4] for instance as described above. With reference to FIG. 7, the span table has the distribution system (431851), absolute coordinates (X1=20, Y1=−30) of the node [3, 3] as the starting point, absolute coordinates (X2=30, Y2=−30) of the node [3, 3, 1] as the ending point, and ID information (ID1=3, ID2=3, ID3=1, ID4 to ID10=0) on the node [3, 3, 1] as the ending point registered therein as to the span between the nodes [3, 3] and [3, 3, 1] for instance as described above.

As for these tables, for instance, in the case where the distribution system diagram is created by GIS which is a system used to combine map data (electronic map) with other data and software (databases and so on) and comprehensively manage and process it or visually display it and analyze and determine it, it is possible to create it by sequentially tracing XY information in a data file used in this system. If the distribution system is likened to a tree, no problem arises even when a trunk which is main is not ID1. Therefore, the IDs should be set to the nodes found by tracing in order of finding.

The node table may have the identification data (an abbreviation for instance) on the electric pole corresponding to the node as the information specifying the node in addition to the above-mentioned identification data on the distribution system, absolute coordinates and ID information of the node registered therein.

The input portion 12 receives a specification of the node performed to the distribution system diagram displayed on the display device by using the input device such as the mouse or the keyboard. The distribution system diagram can be rendered by using the GIS and so on based on the information on the node table and span table stored in the system diagram information management portion 11 so as to be displayed on the display device. And if a desired node is clicked by using the input device such as the mouse, it is possible to recognize which node has been specified from the coordinates of the clicked node and the information on the node table. It is also possible to set an input form on the screen displaying the distribution system diagram so as to directly input the ID information on the desired node into the input form by using the keyboard. If the abbreviations of the electric poles of the nodes are registered in the node table, it is possible to input the abbreviation of the electric pole of the desired node. In this case, it is possible to recognize which node has been specified from the input information inputted from the input form and the information on the node table. Furthermore, it is possible to input the information specifying the switch to be operated from the accident/power failure management system 20 connected via a network and convert it to the ID information on the node. As a business requirement, the specification can be omitted as to the node corresponding to the substation as the starting point of the distribution system.

The search portion 13 searches a span network formed between the nodes specified in the input information received by the input portion 12. To search the network, an SQL sentence automatically generated based on the logic described below is used.

Here, a description will be given as to the logic for identifying the section closed by a plurality of points specified on the distribution system diagram.

Figure 8:
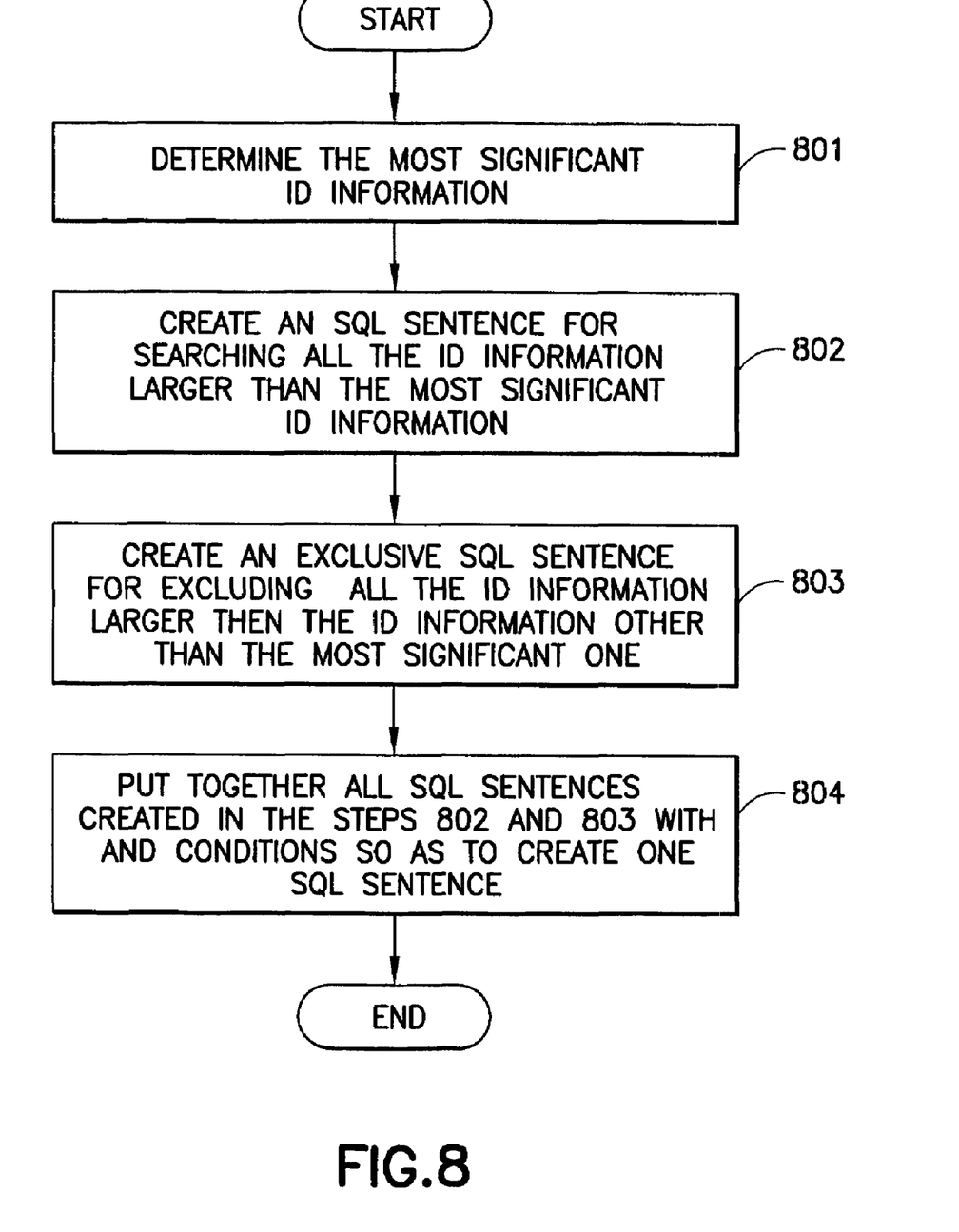
FIG. 8 is a flowchart for explaining SQL sentence generation logic according to this embodiment.

FIG. 8 is a flowchart for explaining SQL sentence generation logic according to this embodiment.

As shown in FIG. 8, first, the most significant ID information is determined out of the ID information on the nodes specified on the distribution system diagram (step 801). Here, in the first place, the most significant ID information is the one having the smallest value when compared in order of ID1, ID2, ID3 and so on. And secondly, it is the one having the least depth (level) of the ID.

For instance, consideration is given to the case where a node N1 of which IDs are [3, 2, 3, 4], a node N2 of which IDs are [2, 2, 3, 1] and a node N3 of which IDs are [2, 1, 3, 1] are specified. In this case, the nodes N2 and N3 have the value of ID1 smaller than that of the node N1. Therefore, the ID information on the nodes N2 and N3 is smaller than that on the node N1. As for the nodes N2 and N3, while ID1 and ID2 have the same values, the node N3 has a smaller value of ID3. Therefore, it is determined that the ID information on the node N3 is the smallest.

Next, the depth of the ID information is compared. And if the depth of the ID information determined to be the smallest under the first condition has the least depth, that ID information is the most significant.

In the case where there is the ID information shallower than the ID information determined to be the smallest, it is determined that the specification is omitted as to the node at the starting point of the distribution system based on the above-mentioned business requirement so that the ID information on the node at the starting point (ID=1, level 1) is the most significant.

For instance, consideration is given to the case where a node N4 of which IDs are [3, 2, 3, 4, 0, 0, and all 0 thereafter] and a node N5 of which IDs are [2, 1, 3, 1, 1, 1, 0, 0, and all 0 thereafter] are specified. In this case, it is determined that the ID information on the nodes N5 is small based on the first condition. However, the ID information on the nodes N4 is at level 4, which is shallower than the ID information on the nodes N5 which is at level 6. In such a case, the ID at the starting point [1, 0, 0, and all 0 thereafter] is the most significant.

After the most significant ID information is determined as above, the SQL sentence for searching all the ID information larger than the most significant ID information is created (step 802). All the nodes downstream from the node having the most significant ID information (hereafter, the most upstream node) are searched by this SQL sentence.

For instance, in the case where the most significant ID information is ID [1, 2, 3] and level 3, the following SQL sentence is created.

ID1=1 AND ID2=2 AND ID3>3

Next, an exclusive SQL sentence for excluding all the ID information larger than the ID information other than the most significant one is created (step 803). All the nodes downstream from the specified nodes are excluded by this SQL sentence.

For instance, in the case where the ID information on the specified node is ID [1, 2, 5, 2, 4] and level 5, the following SQL sentence is created.

ID1!=1 OR ID2!=2 OR ID3!=5 OR ID4!=2 OR ID 5<=4

Lastly, all the SQL sentences created in the steps 802 and 803 are put together by AND conditions so as to create one SQL sentence (step 804). This SQL sentence searches all the nodes downstream from the most upstream node and excludes all the nodes downstream from each of the specified nodes other than the most upstream node. Therefore, a range from the most upstream node to other specified nodes (span network) is identified.

Figure 9:
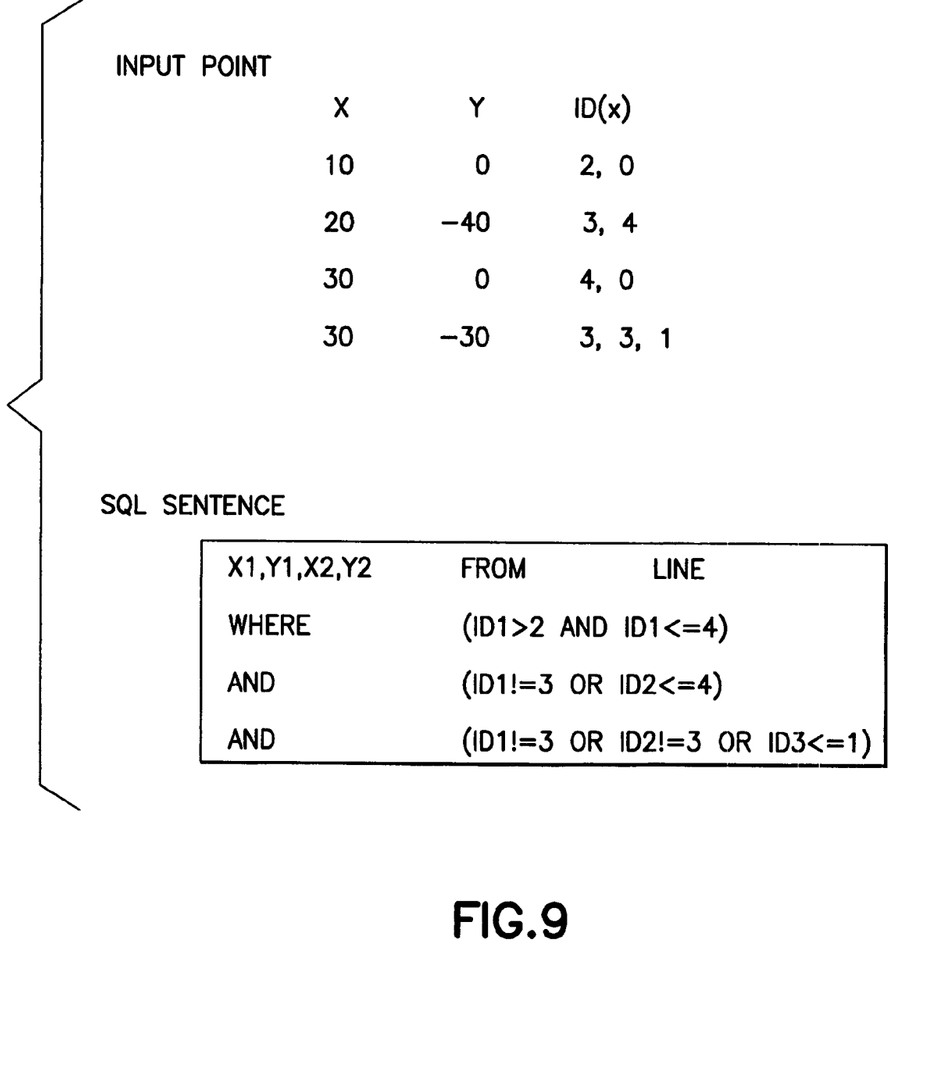
FIG. 9 is a diagram showing an example of an SQL sentence eventually created according to this embodiment.

FIG. 9 is a diagram showing an example of the SQL sentence eventually created according to this embodiment.

In the case where the following four nodes are specified in the distribution system diagram shown in FIG. 5, the range surrounded by these nodes (span network) is identified by the SQL sentence shown in FIG. 9.

Absolute coordinates (X=10, Y=0), ID [2, 0],
Absolute coordinates (X=20, Y=−40), ID [3, 4],
Absolute coordinates (X=30, Y=0), ID [4, 0],
Absolute coordinates (X=30, Y=−30), ID [3, 3, 1]

The output portion 14 reflects the span network identified by the search portion 13 as above on the distribution system diagram displayed on the display device.

Figure 10:
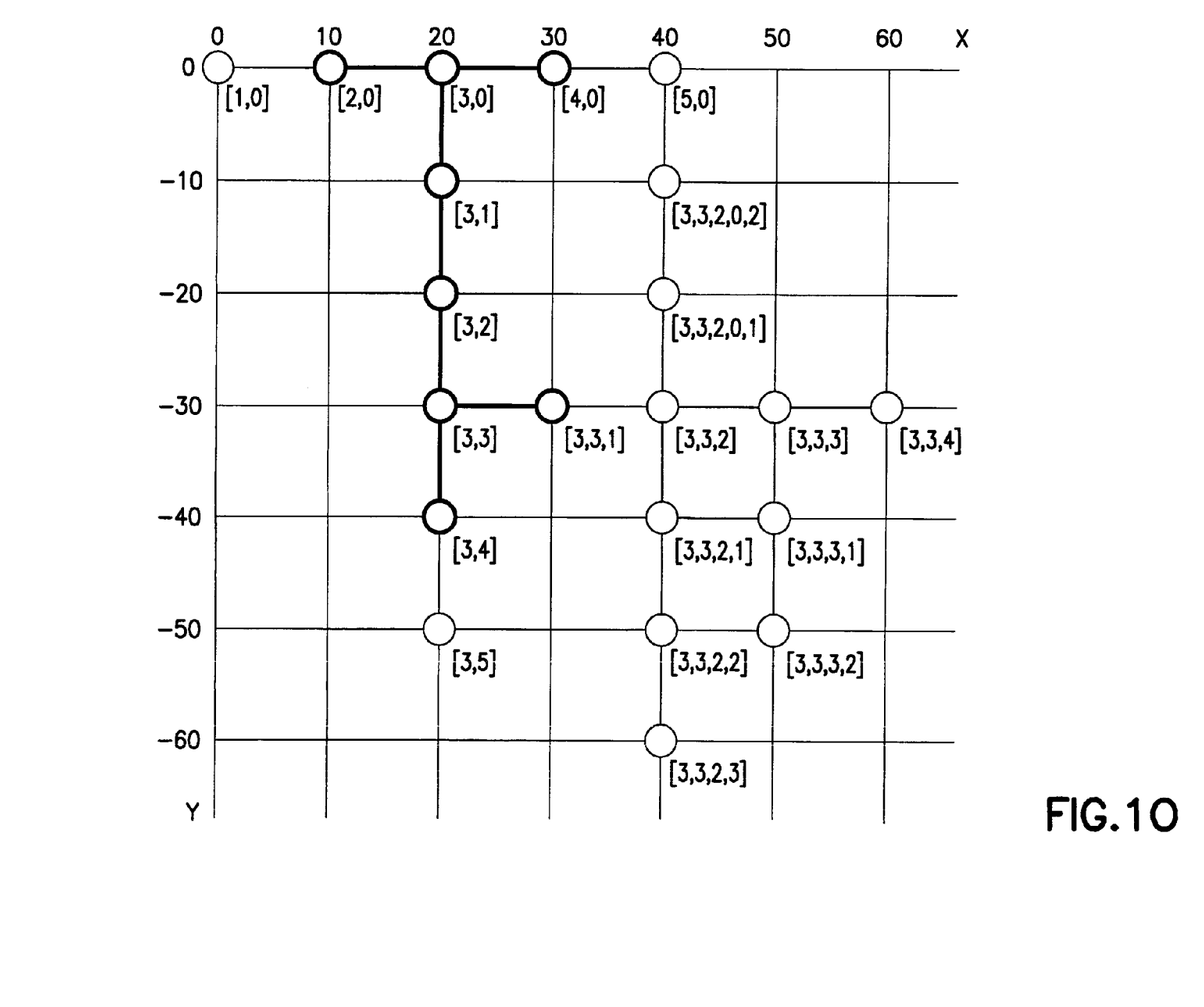
FIG. 10 is a diagram showing how a range identified by the SQL sentence shown in FIG. 9 is reflected in the distribution system diagram in FIG. 5.

FIG. 10 is a diagram showing how the range identified by the SQL sentence shown in FIG. 9 is reflected in the distribution system diagram in FIG. 5.

In FIG. 10, the range indicated in heavy line is the identified range. It is thereby understandable that the range indicated in heavy line is isolated from the distribution system by operating the switches corresponding to the nodes of ID [2, 0], ID [3, 4], ID [4, 0] and ID [3, 3, 1] in the distribution system. Therefore, it is possible to visually represent and simulate the information such as which switch should be operated to stop the supply of the electric power to which area and to restore the supply thereof to which area on the distribution system diagram.

The output portion 14 can not only display-output the span network but also supply the data on the span network to the accident/power failure management system 20 as shown in FIG. 2. To be more specific, it is possible to input the data on the span network obtained by specifying the node corresponding to the switch having had an accident thereon to the accident/power failure management system 20 so as to contribute to identification of the section of the accident and power failure occurrence with the accident/power failure management system 20.

Furthermore, it is possible to closely relate the accident/power failure management system 20 to the section identification system 10. To be more specific, as described above regarding the input portion 12, the information identifying the switch to be operated is inputted from the accident/power failure management system 20 to the section identification system 10 of this embodiment so as to convert it to the ID information on the node and thereby specify the node on the distribution system diagram. And the information on the area identified based on this node specification is returned to the accident/power failure management system 20 to reflect it on the distribution system diagram created by the accident/power failure management system 20. Thus, it is possible to implement the monitoring system capable of monitoring on the distribution system diagram whether or not the power failure has occurred in the area due to the switch having undergone the accident and which area has the electric power supplied by switching the distribution system.

The section identification system according to this embodiment was described above by taking the case of applying it to the management system of the distribution system for instance. However, it goes without saying that the system is applicable as-is as the system for identifying the section between arbitrary nodes and supporting the simulation and monitoring as to various system diagrams such as piping of gas and water service.

What is claimed is:

1. An information processing method for identifying a section in a system diagram with a computer, including:

receiving an input specifying at least one node on said system diagram;

creating a search condition using ID information based on inputted node specification and the ID information on said nodes stored in storage means in advance, said ID information including depth (level) information corresponding to the number of branches in the system diagram;

of the information on the nodes and spans constituting said system diagram stored in the storage means in advance, searching the span between said specified nodes by using said created search condition so as to identify a section on said system diagram constituted by the span; and creating the ID information given to each of the nodes of said system diagram according to the following rules and storing the ID information in said storage means:

a rule for examining the number of spans extending from a noted node;

a rule for selecting one of unprocessed spans and increasing a value of ID(x) of depth (x) by 1 so that the ID(x) becomes ID information on a node at an end point of the selected span; and, if there are unprocessed spans remained, a rule for generating ID(x+1) of depth (x+1) so that ID(x+1)=1 and selecting one of the unprocessed spans so that the ID(x+1) becomes ID information on node at an end point of the selected span, or end; and, if there are still unprocessed spans, a rule for letting ID(x+1)=0, letting x become x+1, generating ID(x+1) of depth (x+1) so that ID(x+1)=1, and selecting one of the unprocessed spans so that the ID(x+1) becomes ID information on node at an end point of the selected span, or end; and, if there are still unprocessed spans, return to the rule for letting ID(x+1)=0, letting x become x+1, generating ID(x+1) of depth (x+1) so that ID(x+1)=1, and selecting one of the unprocessed spans.

2. An information processing method for identifying a section in a system diagram with a computer, including;

receiving an input specifying at least one node on said system diagram;

creating a search condition using ID information based on inputted node specification and the ID information on said nodes stored in storage means in advance, said ID information including depth (level) information corresponding to the number of branches in the system diagram; and of the information on the nodes and spans constituting said system diagram stored in the storage means in advance, searching the span between said specified nodes by using said created search condition so as to identify a section on said system diagram constituted by the span, wherein, the step of creaqting a search condition includes steps of:

a) determining the most significant ID information;

b) creating a search condition for searching all the ID information larger than the most significant ID information;

c) creating an exclusive search condition for excluding all the ID information larger than the ID information other than the most significant ID information; and d) creating a search condition by combining the search condition in step b and the search condition in step c.

* * * * *